(12) United States Patent
Cho et al.

(10) Patent No.: US 9,427,933 B2
(45) Date of Patent: Aug. 30, 2016

(54) QUANTUM ROD SHEET, BACKLIGHT UNIT, DISPLAY DEVICE AND MANUFACTURING METHOD THEREOF

(71) Applicant: Samsung Display Co., Ltd., Yongin (KR)

(72) Inventors: Chi-O Cho, Gwangju (KR); Dong Hoon Kim, Suwon-si (KR); Sang Woo Ha, Yongin-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 63 days.

(21) Appl. No.: 14/301,984

(22) Filed: Jun. 11, 2014

(65) Prior Publication Data

US 2014/0362556 A1   Dec. 11, 2014

(30) Foreign Application Priority Data

Jun. 11, 2013 (KR) .................. 10-2013-0066699

(51) Int. Cl.
*B32B 3/30* (2006.01)
*F21V 8/00* (2006.01)
*B82Y 20/00* (2011.01)

(52) U.S. Cl.
CPC ............ *B32B 3/30* (2013.01); *G02B 6/005* (2013.01); *G02B 6/0088* (2013.01); *B82Y 20/00* (2013.01); *Y10S 977/834* (2013.01); *Y10T 428/24562* (2015.01); *Y10T 428/31504* (2015.04); *Y10T 428/31725* (2015.04); *Y10T 428/31786* (2015.04); *Y10T 428/31938* (2015.04)

(58) Field of Classification Search
CPC ........... F21V 9/14; F21V 13/02; G21K 5/04; B32B 3/30; G02B 6/0088; G02B 6/005; Y02B 20/36; B82Y 20/00; Y10S 977/834; Y10T 428/31786; Y10T 428/31725; Y10T 428/31504; Y10T 428/31938; Y10T 428/24562
See application file for complete search history.

(56) References Cited

U.S. PATENT DOCUMENTS

| 7,132,787 B2 | 11/2006 | Ozkan et al. |
| 8,459,855 B2 * | 6/2013 | Anandan .............. G02B 6/0036 362/231 |
| 2011/0062414 A1 | 3/2011 | Wang et al. |
| 2014/0233212 A1 * | 8/2014 | Park .................. G02F 1/133606 362/84 |

FOREIGN PATENT DOCUMENTS

| JP | 2006-023614 | 1/2006 |
| JP | 2006-323119 | 11/2006 |
| JP | 2010-144032 | 7/2010 |
| KR | 10-2012-0066322 | 6/2012 |

OTHER PUBLICATIONS

Tie Wang et al., "Self-Assembled Colloidal Superparticles from Nanorods", Science, vol. 338, Oct. 19, 2012, p. 358-363.

* cited by examiner

*Primary Examiner* — Bao Q Truong
(74) *Attorney, Agent, or Firm* — Cantor Colburn LLP

(57) ABSTRACT

A quantum rod sheet includes: a first support layer including a plurality of grooves which extends substantially in a predetermined direction; a plurality of quantum rods arranged substantially in the predetermined direction along the grooves of the first support layer; and a second support layer which covers the first support layer and the quantum rods.

7 Claims, 15 Drawing Sheets

QUANTUM ROD SHEET, BACKLIGHT UNIT, DISPLAY DEVICE AND MANUFACTURING METHOD THEREOF

This application claims priority to Korean Patent Application No. 10-2013-0066699, filed on Jun. 11, 2013, and all the benefits accruing therefrom under 35 U.S.C. §119, the content of which in its entirety is herein incorporated by reference.

BACKGROUND (a) Field

Exemplary embodiments of the invention relate to a quantum rod sheet, a backlight unit including the quantum rod sheet, a display device including the backlight unit and a manufacturing method thereof.

(b) Description of the Related Art

Various types of flat panel display, such as a liquid crystal display ("LCD"), a plasma display panel ("PDP"), an organic light emitting display ("OLED"), an electrowetting display ("EWD"), an electrophoretic display ("EPD"), an embedded micro-cavity display ("EMD"), and a nano-crystal display ("NCD")", have been developed from a cathode ray tube ("CRT") type using a cathode ray tube.

Among the various types of flat panel display, the LCD, which is one of the most widely used types, has characteristics, such as miniaturization, weight lightening, and low power consumption. In general, the LCD is a device, in which an electric field is generated in a liquid crystal material disposed between an upper substrate and a lower substrate by applying different potentials to a pixel electrode and a common electrode thereof such that an arrangement of liquid crystal molecules is changed, and transmittance of light is thereby controlled to display an image.

In the LCD, a liquid crystal panel does not emit light therefrom, and the liquid crystal panel thereby includes a backlight unit for providing light to the liquid crystal panel. Among the various types of flat panel display, other light receiving type display devices may include the backlight unit.

The backlight unit typically includes a light source and a plurality of optical sheets to improve luminance of light provided from the light source and to distribute the light substantially uniformly over an entire region thereof. Among the optical sheets, an optical sheet that may be used to improve the luminance (e.g., a luminance enhancement film) is typically substantially expensive, which may lead to an increase in manufacturing costs of the display device.

In a backlight unit configured to generate white light, the backlight unit typically includes a light emitting diode ("LED") that emits light having a specific wavelength and a phosphor that changes the light having the specific wavelength emitted from the LED into the white light to provide the white light.

SUMMARY

Exemplary embodiments of the invention provide a quantum rod sheet, a backlight unit including the quantum rod sheet, a display device including the backlight unit including the rod sheet, and a manufacturing method thereof. In such embodiments, a manufacturing cost is substantially reduced by omitting an optical sheet, which may be expensive, or by reducing a manufacturing cost of a light source for a light emitting diode ("LED") of the backlight unit by providing the quantum rod sheet.

An exemplary embodiment of the invention provides a quantum rod sheet including: a first support layer including a plurality of grooves which extends in a predetermined direction; a plurality of quantum rods arranged substantially in the predetermined direction along the grooves of the first support layer; and a second support layer which covers the first support layer and the quantum rods.

In an exemplary embodiment, a section shape of the grooves may have a triangular shape, a quadrangular shape, or a partially round shape.

In an exemplary embodiment, when a length of the quantum rods is denoted by b, and a width of the grooves is denoted by w, the grooves may have a structure which satisfies the following inequation: w<b.

In an exemplary embodiment, when a diameter of the quantum rods is denoted by a, and a depth of the grooves is denoted by h, the grooves may have a structure which satisfies the following inequation: h>3a.

In an exemplary embodiment, the section shape of the grooves may be a triangular shape, and when a depth of the grooves is denoted by h, and a width of the grooves is denoted by w, the grooves may have a structure which satisfies the following inequation:

$$h > \frac{\sqrt{3}}{2} \times w.$$

In an exemplary embodiment, the quantum rod sheet may further include a plurality of protective layers disposed on an outer surface of the first support layer and an outer surface of the second support layer.

In an exemplary embodiment, the quantum rod sheet may further include a plurality of barriers disposed on the outer surface of the first support layer and the outer surface of the second support layer, and disposed on an inner surface of the protective layer.

Another exemplary embodiment of the invention provides a quantum rod sheet, including: a crystalline polymer layer including a plurality of crystalline polymers which extends in a predetermined direction; and a plurality of quantum rods which are arranged substantially in the predetermined direction along the crystalline polymers.

In an exemplary embodiment, the crystalline polymer layer may include polybutylene terephthalate ("PBT"), polyethylene terephthalate ("PET"), polypropylene ("PP"), polyethylene ("PE"), nylon ("PA"), polyphenylene sulfide ("PPS"), liquid crystal polymer ("LCP"), polyetherketone ("PEK"), polycyclohexylene terephthalate ("PCT"), or a combination thereof.

Another exemplary embodiment of the invention provides a backlight unit, including: a light source which emits light; and a quantum rod sheet which receives and polarizes the light provided from the light source, where the quantum rod sheet includes a plurality of quantum rods which are arranged in a predetermined direction.

In an exemplary embodiment, the light source may include an LED which emits light substantially in a predetermined wavelength range corresponding to ultraviolet rays or blue light.

In an exemplary embodiment, the quantum rods of the quantum rod sheet may include at least two quantum rods having different diameters at a central section thereof.

In an exemplary embodiment, the backlight unit may further include a diffusion plate or a prism sheet disposed on the quantum rod sheet.

In an exemplary embodiment, the backlight unit may further include a pair of diffusion plates disposed on the quantum rod sheet.

Another exemplary embodiment of the invention provides a display device including: a display panel; an upper polarizing plate and a lower polarizing plate which are disposed on opposing surfaces of the display panel; and a backlight unit disposed under the display panel, where the backlight unit includes: a light source which emits light; and a quantum rod sheet which receives and polarizes the light provided from the light source and including a plurality of quantum rods which are arranged substantially in a predetermined direction.

In an exemplary embodiment, a transmissive axis of the lower polarizing plate may be substantially parallel to a polarizing axis of the quantum rod sheet corresponding to the predetermined direction.

In an exemplary embodiment, the light source may include an LED which emits light substantially in a predetermined wavelength range corresponding to ultraviolet rays or blue light.

In an exemplary embodiment, the quantum rods of the quantum rod sheet may include at least two quantum rods having different diameters at a central section thereof.

In an exemplary embodiment, the display device may further include a diffusion plate or a prism sheet disposed on the quantum rod sheet.

In an exemplary embodiment, the display device may further include a pair of diffusion plates disposed on the quantum rod sheet.

Another exemplary embodiment of the invention provides a manufacturing method of a quantum rod sheet, the manufacturing method including: providing a first support layer by stacking a material thereof; forming a plurality of grooves which extend substantially in a predetermined direction on the first support layer; arranging a plurality of quantum rods substantially in the predetermined direction by spraying the quantum rods in the grooves; and providing a second support layer which covers the first support layer and the quantum rods.

In an exemplary embodiment, the forming the grooves may include imprinting the grooves with a mold having protrusions corresponding to the grooves.

In an exemplary embodiment, the manufacturing method of a quantum rod sheet may further include providing a plurality of protective layers an outer surface of the first support layer and an outer surface of the second support layer.

In an exemplary embodiment, the manufacturing method of a quantum rod sheet may further include providing a plurality of barriers the outer surface of the first support layer, on the outer surface of the second support layer and on an inner surface the protective layers.

Another exemplary embodiment of the invention provides a manufacturing method of a quantum rod sheet, the manufacturing method including: coextruding a material including a plurality of quantum rods and a crystalline polymer material, where the crystalline polymer material includes a plurality of crystal polymers; and aligning the crystal polymers substantially in a predetermined direction by stretching the coextruded material substantially in the predetermined direction, where the quantum rods are arranged substantially in the predetermined direction by the crystal polymers aligned substantially in the predetermined direction, by the stretching.

In an exemplary embodiment, the crystalline polymer layer may include PBT, PET, PP, PE, PA, PPS, LCP, PEK, PCT, or a combination thereof.

As set forth above, according to exemplary embodiments of the invention, the display device includes the quantum rod sheet having quantum rods arranged substantially in a predetermined direction, such that an expensive film typically used in a display device, such as the luminance enhancement film and component for emitting the white light may be omitted. Therefore, the manufacturing costs of the backlight unit and the display device may be substantially reduced.

BRIEF DESCRIPTION OF THE DRAWINGS

The above and other features of the invention will become more apparent by describing in detail exemplary embodiments thereof with reference to the attached drawings, in which.

DETAILED DESCRIPTION

Figure 1:
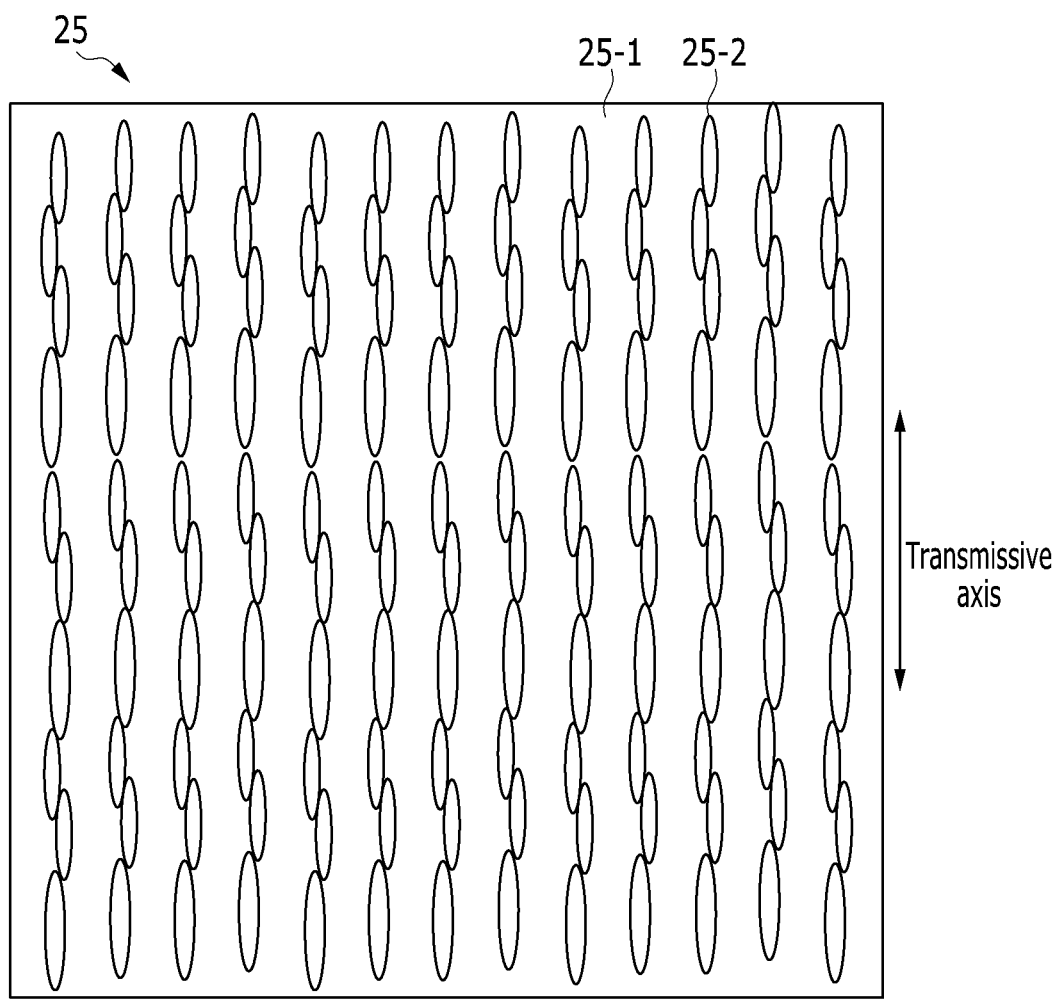
FIG. 1 is a plan view of an exemplary embodiment of a quantum rod sheet according to the invention.

The invention will be described more fully hereinafter with reference to the accompanying drawings, in which embodiments of the invention are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims set forth herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, an exemplary embodiment of a quantum rod sheet according to the invention will be described in detail with reference to FIG. 1.

FIG. 1 is a plan view of an exemplary embodiment of a quantum rod sheet according to the invention.

In an exemplary embodiment, a quantum rod sheet 25 includes a support layer 25-1 and a plurality of quantum rods 25-2 disposed on the support layer 25-1 and arranged substantially along a predetermined direction. In such an embodiment, the support layer 25-1 supports and encloses the quantum rods 25-2.

In an exemplary embodiment, the support layer 25-2 may include a plastic resin. The plastic resin includes polymer or various materials for a film, but the materials is not limited to a specific type of material. According to an exemplary embodiment of the invention, the plastic resin may have characteristics in which the plastic resin is hardened to support the arrangement of the quantum rods 25-2. In such an embodiment, the plastic resin may be substantially transparent to transmit light therethrough, but the light transmittance thereof is not limited to a specific transmittance.

The quantum rods 25-2 are arranged substantially in the predetermined direction in the support layer 25-1. In such an embodiment, a longitudinal axis of each quantum rod 25-2 may be disposed substantially in the predetermined direction. In such an embodiment, the quantum rods 25-2 may be arranged along a plurality of imaginary lines on the support layer 25-1, where the imaginary lines are substantially parallel to each other and substantially parallel to the predetermined direction.

A central section of the quantum rod 25-2 may have a diameter of several nanometers and the quantum rod 25-2 may have a length of tens or hundreds of nanometers. A material of the quantum rod 25-2 is not limited to a specific material, and the quantum rod 25-2 may include various materials used for forming a quantum dot.

According to an exemplary embodiment of the invention, some of the quantum rods 25-2 may be obliquely arranged at an angle exceeding about 0° but less than about 10° with respect to the predetermined direction. Herein, the angle of a quantum rod 25-2 with respect to the predetermined direction may be defined as an angle between a longitudinal axis of the quantum rod 25-2 and the predetermined direction.

In an exemplary embodiment, the diameters of the quantum rods 25-2 at a central section, that is, the diameters of the central sections of the quantum rods 25-2, included in the quantum rod sheet 25 may be substantially the same as each other. In an alternative exemplary embodiment, the quantum rod sheet may include two kinds of quantum rods 25-2 including different sizes, e.g., different diameters at a central section, of the quantum rods 25-2 from each other. In another alternative exemplary embodiment, the quantum rod sheet may include at least three kinds of quantum rods 25-2 having different diameters at a central section from each other. In such embodiments, a wavelength range of light, which is polarized in an extending direction of the quantum rod 25-2, is determined based on the diameters of the quantum rods 25-2 at a central section. Therefore, in an exemplary embodiment of the invention, in which the diameter of the quantum rod 25-2 at a central section is various, light having various wavelengths may be polarized in the arranged direction of the quantum rod 25-2.

As described above, an exemplary embodiment of the quantum rod sheet 25 has polarization characteristics. In such an embodiment, light incident on the quantum rod sheet 25 is polarized substantially in an arrangement direction (e.g., the arranged direction) of the quantum rod 25-2 and then emitted from the quantum rod sheet 25. A transmissive axis of the quantum rod sheet 25 is substantially the same as the arrangement direction of the quantum rod 25-2.

Hereinafter, exemplary embodiments of a manufacturing method of the quantum rod sheet 25 having the quantum rods 25-2 arranged substantially in a predetermined direction in the support layer 25-1 will be described in detail with reference to FIGS. 2 to 12.

First, an exemplary embodiment of the quantum rod sheet 25 will be described with reference to FIG. 2.

Figure 2:
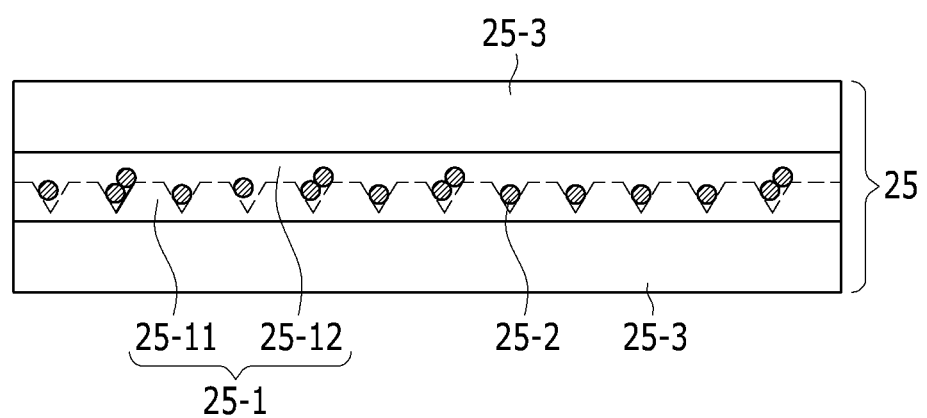
FIG. 2 is a cross-sectional view of an exemplary embodiment of the quantum rod sheet according to the invention.

FIG. 2 is a cross-sectional view of an exemplary embodiment of the quantum rod sheet according to the invention.

In an exemplary embodiment shown in FIG. 2, the quantum rod sheet 25 includes the quantum rods 25-2 arranged in a predetermined direction, similarly to the exemplary embodiment shown in FIG. 1.

In such an embodiment, as shown in FIG. 2, the quantum rod sheet 25 includes the quantum rod 25-2, the support layer 25-1 that encloses and supports the quantum rod 25-2, and protective layers 25-3, each disposed on an outer surface of the support layer 25-1.

In such an embodiment, the support layer 25-1 includes a first support layer 25-11 and a second support layer 25-12. In such an embodiment, a groove that extends substantially in the predetermined direction is defined in the first support layer 25-11, the quantum rods 25-2 are arranged in the groove in the first support layer 25-11, and the second support layer 25-12 covers the quantum rods 25-2 which are arranged in the groove of the first support layer 25-11. In an exemplary embodiment, the first support layer 25-11 and the second support layer 25-12 may include a same material as each other, but not being limited thereto. In an alternative exemplary embodiment, the first support layer 25-11 and the second support layer 25-12 may include different materials from each other. In one exemplary embodiment, for example, the first support layer 25-11 and the second support layer 25-12 includes a plastic resin. The plastic resin includes polymer or various materials used for forming a film, but a kind of the materials is not limited to a specific kind. According to an exemplary embodiment of the invention, the plastic resin of the first support layer 25-11 and the second support layer 25-12 have characteristics in which the plastic resin are hardened to support the arrangement of the quantum rods 25-2. In such an embodiment, the plastic resin may be substantially transparent to transmit light therethrough, but the light transmittance thereof is not limited to a specific transmittance.

According to an exemplary embodiment, as shown in FIG. 2, the groove may have a V-shaped (e.g., triangular) section structure and extends in a direction substantially parallel to the predetermined direction, which is direction of a transmissive axis of the quantum rod sheet 25. The V-shaped section structure of the groove allows the quantum rods 25-2 to be arranged substantially in the predetermined direction. In an exemplary embodiment, as shown in FIG. 2, one or two quantum rods 25-2 may be included in the groove, but not being limited thereto. In an alternative exemplary embodiment, a large number of quantum rods 25-2 (e.g., greater than two) may be included in the groove.

The protective layers 25-3 are disposed at opposing sides of (e.g., on upper and lower surfaces of) the support layer 25-1 and protect the support layer 25-1 and the quantum rod 25-2. The protective layer 25-3 may include a plastic resin having light transmission characteristics such as polyethylene terephthalate ("PET"), for example. In an alternative exemplary embodiment, the protective layer 25-3 may be omitted.

Hereinafter, an exemplary embodiment of a manufacturing method of the quantum rod sheet 25 of FIG. 2 will be described with reference to FIGS. 3 to 5.

Figure 3:
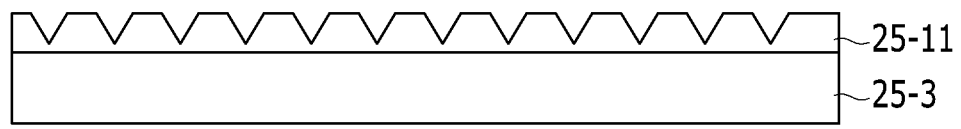
FIGS. 3 to 5 are cross-sectional views illustrating an exemplary embodiment of a manufacturing method of the quantum rod sheet of FIG. 2.
Figure 4:
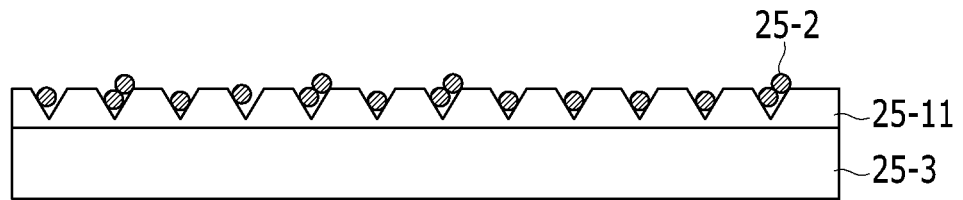
Figure 5:
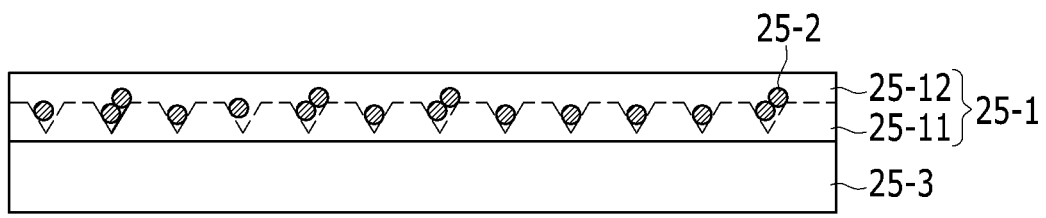

FIGS. 3 to 5 are cross-sectional views illustrating an exemplary embodiment of a manufacturing method of the quantum rod sheet of FIG. 2.

First, as illustrated in FIG. 3, the first support layer 25-11 is provided on the protective layer 25-3 including the plastic resin, such as PET, for example, by providing, e.g., stacking, a material for forming the first support layer 25-11 on the protective layer 25-3, and then the groove is formed in the first support layer 25-11 along a line substantially in a predetermined direction.

In such an embodiment, the groove may be formed on the first support layer 25-11 by various methods. In one exemplary embodiment, for example, the groove may be formed by being imprinted using a mold having the V-shaped protrusion. According to an alternative exemplary embodiment, the groove may be formed by irradiating light, such as ultraviolet rays, to a predetermined portion of the first support layer 25-11.

Next, as illustrated in FIG. 4, the quantum rods 25-2 may be provided in the grooves of the first support layer 25-11. In one exemplary embodiment, for example, the quantum rods 25-2 may be sprayed to be seated in the grooves of the first support layer 25-11. In such an embodiment, the quantum rods 25-2 are disposed to be arranged substantially in the extending direction of the groove. In an exemplary embodiment, the size of the groove and the quantum rods 25-2 are predetermined to prevent the quantum rods 25-2 in the groove from being disposed in a direction substantially vertical to the extending direction of the groove, such that all of the quantum rods 25-2 may be arranged in predetermined direction (e.g., the extending direction of the groove).

After the quantum rods 25-2 are provided in and arranged along the groove, the first support layer 25-11 and the quantum rod 25-2 may be stabilized by a dry process.

Next, as illustrated in FIG. 5, the second support layer 25-12 is provided to cover the quantum rods 25-2 in the first support layer 25-11, such that the support layer 25-1 is completed. In such an embodiment, the first support layer 25-11 and the second support layer 25-12 may include a same material as each other. In one exemplary embodiment, for example, the second support layer 25-12 is stacked to the first support layer 25-11, and then the second support layer 25-12 may be hardened using ultraviolet rays.

Next, as illustrated in FIG. 2, the protective layer 25-3 including the plastic resin, such as PET may be provided on an outer surface of the second support layer 25-12.

In such an embodiment, the manufactured quantum rod sheet 25 includes the quantum rod 25-2 arranged substantially in predetermined direction, which is provided in the groove of the first support layer 25-11. In an exemplary embodiment, as shown in FIG. 2, the groove has a V-like shape. In such an embodiment, the arrangement of the quantum rods 25-2 may be determined based on the size, e.g., a width or a depth, of the groove, and various exemplary embodiments of the groove will hereinafter be described in detail with reference to FIGS. 6 to 8.

Figure 6:
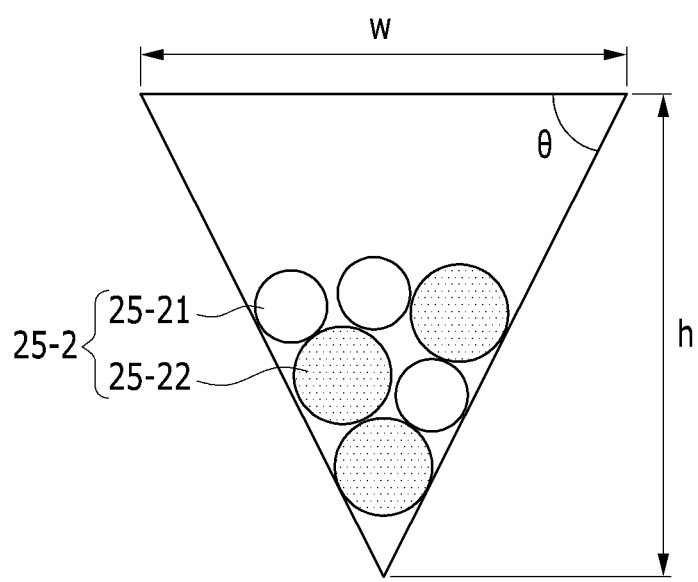
FIGS. 6 to 8 are cross-sectional views of exemplary embodiments of a groove a defined on the quantum rod sheet of FIG. 2.
Figure 7:
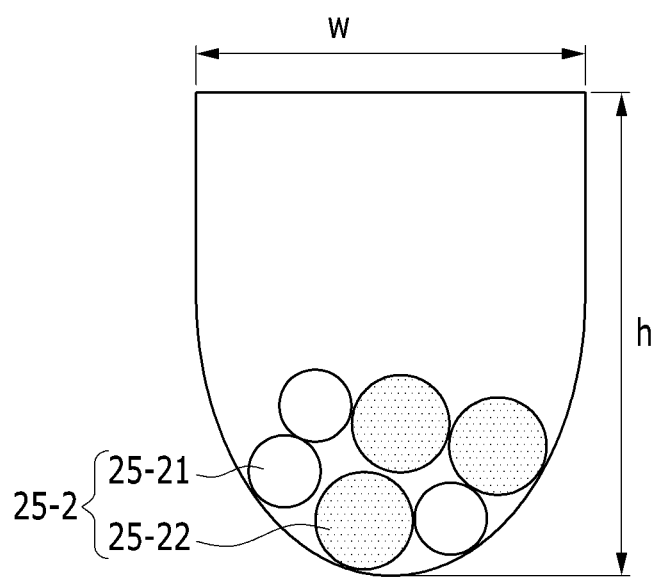
Figure 8:
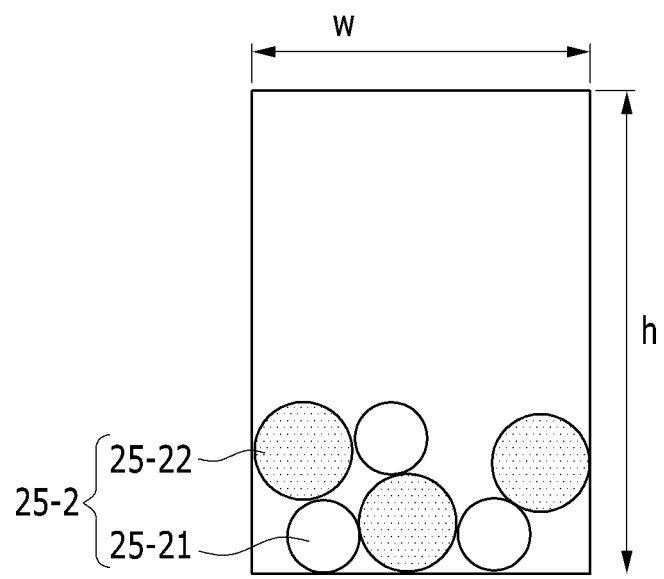

FIGS. 6 to 8 are cross-sectional views illustrating exemplary embodiments of grooves defined on the quantum rod sheet.

FIGS. 6 to 8 illustrate exemplary embodiments of the groove of the first support layer 25-11 in a closed curved line. Further, FIGS. 6 to 8 illustrate exemplary embodiment including two kinds of quantum rods 25-2. In such embodiments, a first kind of quantum rods 25-2 has a small diameter at a central section (hereinafter, referred to as a first quantum rod 25-21) and a second kind of quantum rods 25-2 has a large diameter at a central section (hereinafter, referred to as a second quantum rod 25-22). In such embodiments, light of two wavelength ranges may be polarized by the quantum rod sheet in the extending direction of the quantum rods 25-2.

Hereinafter, an exemplary embodiment of the groove shown in FIG. 6 will be described.

The groove shown in FIG. 6 has a V-shaped section structure (triangular shape) and a depth of the groove is denoted by h and a maximum width of the groove is denoted by w. When the diameter of the first quantum rod 25-21 at a central section is denoted by a, the diameter of the second quantum rod 25-22 at a central section is denoted by a', and the length of the first and second quantum rods 25-21 and 25-22 is denoted by b, the groove and the quantum rod 25-2 may have a structure that satisfies the following Inequations 1 and 2.

$$w<b \qquad \text{Inequation 1}$$

$$h>3a \text{ or/and } h>3a' \qquad \text{Inequation 2}$$

Inequation 1 represents a condition in which the length of the quantum rod 25-2 is greater than the width of the groove to effectively prevent the quantum rod 25-2 from being arranged in a direction substantially vertical to the extending direction within the groove.

Inequation 2 represents a condition in which the depth of the groove is greater than three times the diameter of the first and second quantum rods 25-21 and 25-22 to provide at least three layers of the quantum rods 25-2 in the groove. As described above, in an exemplary embodiment, a plurality of layers of the quantum rods 25-2 (e.g., three or more layers) is disposed in a groove such that light passes through several layers of the quantum rod 25-2, and the polarization effect is thereby increased. In one exemplary embodiment, for example, where the quantum rod sheet includes a single layer of the quantum rods 25-2, the polarization efficiency of light may be about 75%. In one exemplary embodiment, for example, where the quantum rod sheet includes three or more layers of the quantum rod 25-2, the polarization efficiency of light may be greater than about 88%.

Meanwhile, as illustrated in FIG. 6, the groove having the V-shaped section structure may have a structure that satisfies the following Inequation 3.

Inequation 3:

$$h>\frac{\sqrt{3}}{2}\times w$$

Inequation 3 represents a condition on an angle (referred as to 'θ' in FIG. 6) formed toward a depth direction at an opened upper side of the groove in a triangle structure formed by the groove. Inequation 3 is a modification of a tangent (tan) value of the angle θ and is a condition in which the angle θ is greater than about 60° such that the groove becomes substantially steep.

According to the condition of Inequation 3, in an exemplary embodiment, the quantum rod 25-2 is effectively prevented from being arranged outside the groove, and may be effectively arranged in the groove.

Hereinafter, a section structure of alternative exemplary embodiments of the groove will be described with reference to FIGS. 7 and 8.

FIG. 7 illustrates an exemplary embodiment of the groove having a U-shaped section structure. In such an embodiment, the groove may be formed on the first support layer 25-11 using a protrusion of which the end has a round structure. In such an embodiment, a surface of the first support layer 25-11 does not have a sharp groove, but has a groove structure of which the end has a round.

The groove shown in FIG. 7 may have a structure that satisfies Inequations 1 and 2, described above with reference to FIG. 6.

FIG. 8 illustrates an exemplary embodiment of the groove having a quadrangular section structure. In such an embodiment, the groove may be formed on the first support layer 25-11 using a protrusion having a quadrangular structure. In such an embodiment, the groove having a side wall substantially perpendicular to a surface of the first support layer 25-11, in which the grove is formed.

The groove shown in FIG. 8 may have a structure that satisfies Inequations 1 and 2, described above.

The section structure of the groove is not limited to the structures shown in FIGS. 6 to 8, but may be variously modified.

Hereinafter, an alternative exemplary embodiment of the quantum rod sheet 25 will be described with reference to FIG. 9.

Figure 9:
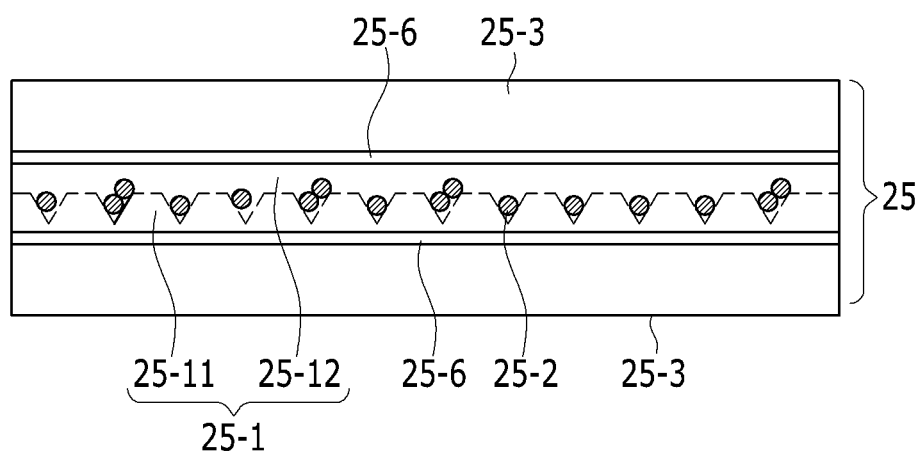
FIG. 9 is a cross-sectional view of an alternative exemplary embodiment of a quantum rod sheet according to the invention.

FIG. 9 is a cross-sectional view of an alternative exemplary embodiment of a quantum rod sheet according to the invention.

The quantum rod sheet in FIG. 9 is substantially the same as the quantum rod sheet shown in FIG. 2 except for a barrier 25-6 between the support layer 25-1 and the protective layer 25-3. The same or like elements shown in FIG. 9 have been labeled with the same reference characters as used above to describe the exemplary embodiments of the quantum rod shown in FIG. 2, and any repetitive detailed description thereof may hereinafter be omitted or simplified.

In an exemplary embodiment, as shown in FIG. 9, the barrier 25-6 is disposed on an outer side (e.g., an outer surface) of the support layer 25-1 and is disposed in an inner side (e.g., an inner surface) of the protective layer 25-3. In such an embodiment, the barrier may be provided to protect the quantum rod 25-2 such that the characteristics of the quantum rod 25-2 may be effectively prevented from being deteriorated during a process of providing (e.g., attaching or forming) the protective layer 25-3. In such an embodiment, the barrier may be provided to attach the support layer 25-1 and the protective layer 25-3 such that the adhesive characteristics of the support layer 25-1 and the protective layer 25-3 is substantially improved. A material used as the barrier 25-6 may include a material having characteristics for transmitting light, or may include various materials selected based on a function of the barrier 25-6.

Hereinafter, an alternative exemplary embodiment of the quantum rod sheet 25 will be described with reference to FIGS. 10 and 12.

First, the structure of an alternative exemplary embodiment of the quantum rod sheet 25 will be described with reference to FIG. 10.

Figure 10:
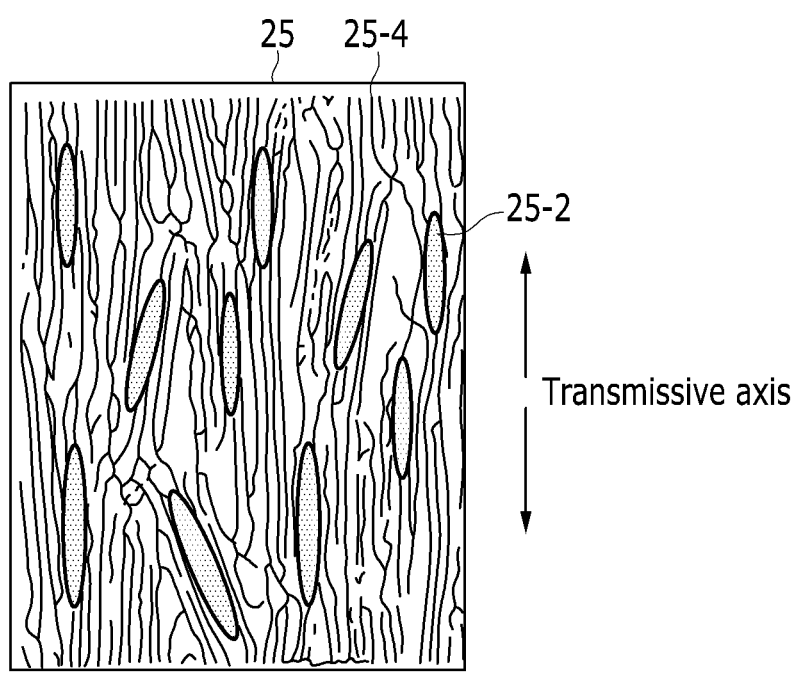
FIG. 10 is a plan view of an alternative exemplary embodiment of the quantum rod sheet according to the invention.

FIG. 10 is a plan view of an alternative exemplary embodiment of the quantum rod sheet according to the invention.

The quantum rod sheet 25 of FIG. 10 includes the quantum rods 25-2 and a crystalline polymer layer 25-4 that encloses the quantum rod 25-2 and arranges the quantum rods 25-2 in a predetermined direction. In such an embodiment, the crystalline polymer defines the arrangement direction of the quantum rods 25-2. In such an embodiment, the crystalline polymer layer 25-4 has a structure in which crystalline polymers included in the crystalline polymer layer 25-4 are arranged substantially in the predetermined direction, and thus the quantum rods 25-2 disposed therebetween are also arranged substantially in the predetermined direction.

The crystalline polymer layer 25-4 may include the plastic resin including the crystalline polymer, and transmits light therethrough. In one exemplary embodiment, for example, the crystalline polymer layer 25-4 may include polybutylene terephthalate ("PBT"), PET, polypropylene ("PP"), polyethylene ("PE"), nylon ("PA"), polyphenylene sulfide ("PPS"), liquid crystal polymer ("LCP"), polyetherketone ("PEK"), polycyclohexylene terephthalate ("PCT"), or a combination thereof.

In such an embodiment, may the crystalline polymers of the crystalline polymer layer 25-4 may not be aligned substantially uniformly in predetermined direction, and therefore at least a portion of the crystalline polymers may have a structure in which the arrangement direction of the quantum rods 25-2 deviates from the predetermined direction (e.g., the polarization direction). In such an embodiment, the polarization direction may be defined as a direction in which the most of the quantum rods 25-2 are arranged. According to an exemplary embodiment, as shown in FIG. 10, a portion of the quantum rods 25-2 may deviate from the predetermined direction (e.g., the polarization direction), such that the polarization efficiency of the quantum rod sheet 25 may be somewhat lowered, but the quantum rod sheet 25 may function substantially effectively in the backlight unit, and the like.

In such an embodiment, the quantum rod sheet 25 may further include the protective layer (referring to 25-3 of FIG. 2) or the barrier (referring to 25-6 of FIG. 9), which is disposed outside (e.g., on an outer surface of) the crystalline polymer layer 25-4.

Hereinafter, an exemplary embodiment of a manufacturing method of the quantum rod sheet 25 shown in FIG. 10 will be described with reference to FIGS. 11 and 12.

Figure 11:
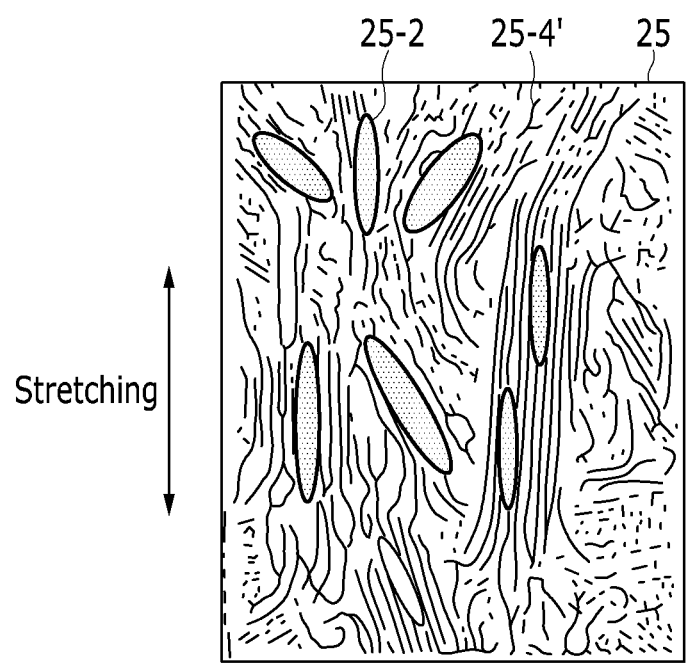
FIGS. 11 and 12 are diagrams illustrating an exemplary embodiment of a manufacturing method of the quantum rod sheet of FIG. 10.
Figure 12:
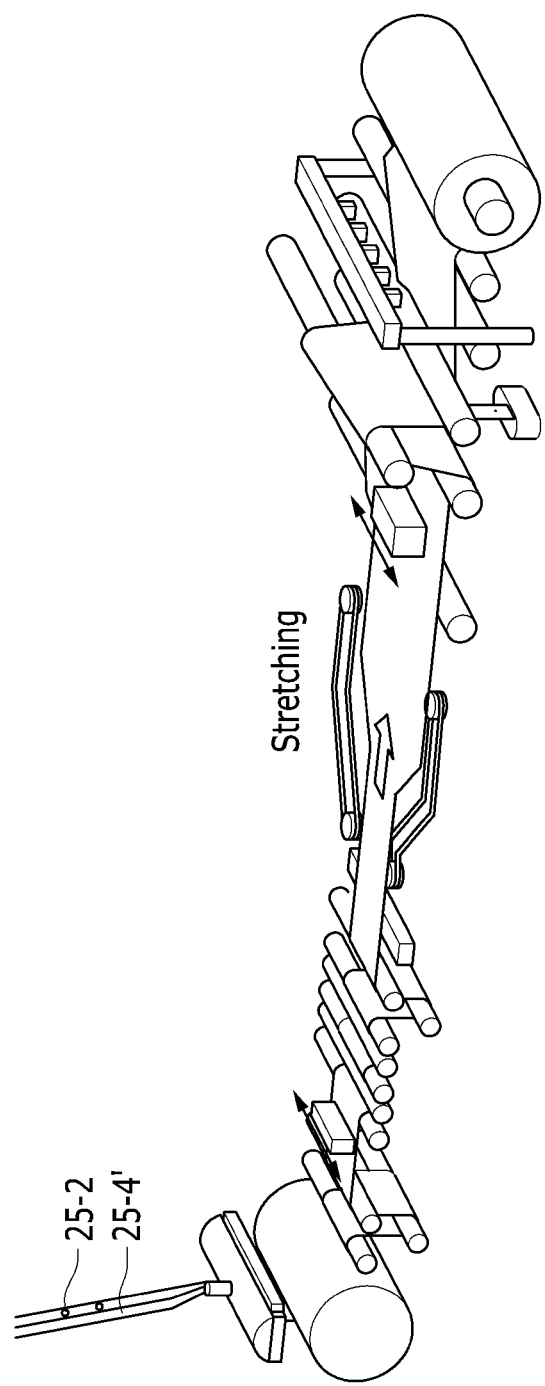

FIGS. 11 and 12 are diagrams illustrating an exemplary embodiment of a manufacturing method of the quantum rod sheet show in FIG. 10.

First, FIG. 11 illustrates a sheet including a layer 25-4' in which the crystalline polymers and the quantum rods 25-2 are randomly aligned. In an exemplary embodiment, the exemplary embodiment of the quantum rod sheet 25 shown in FIG. 10 is formed by stretching the sheet including randomly arranged crystalline polymers and the quantum rods 25-2 in a predetermined direction. In an exemplary embodiment, the sheet is stretched substantially in the predetermined direction and the crystalline polymer is thereby arranged in the direction to which the sheet is stretched, such that the quantum rod 25-2 may be arranged in a direction to which is the sheet is stretched. The stretched direction may be the transmissive axis direction of the quantum rod sheet 25.

An exemplary embodiment of the manufacturing method of the quantum rod sheet 25 will be described in greater detail with reference to FIG. 12.

In an exemplary embodiment, as illustrated in FIG. 12, the quantum rod 25-2 and a crystalline polymer material 25-4' may be coextruded with being mixed with each other. In such an embodiment, the coextruded material is stretched in a predetermined direction while moving to the predetermined direction by a roller. By the stretched direction, the arrangement direction of the quantum rods 25-2 is defined in the quantum rod sheet 25, and the polarization direction of the quantum rod sheet 25 is thereby defined.

In an alternative exemplary embodiment, the arrangement direction of the quantum rods 25-2 may be defined by a separate stretching procedure.

Various exemplary embodiments of the quantum rod sheet 25 are described with reference to FIGS. 1 to 12. Such an embodiment of the quantum rod sheet 25 may be used as an optical sheet in the backlight unit 20 used in a light receiving type display device such as the liquid crystal display.

Hereinafter, an exemplary embodiment of a display device including a backlight unit including the quantum rod sheet 25 will be described.

First, an exemplary embodiment of a display device will be described with reference to FIG. 13.

Figure 13:
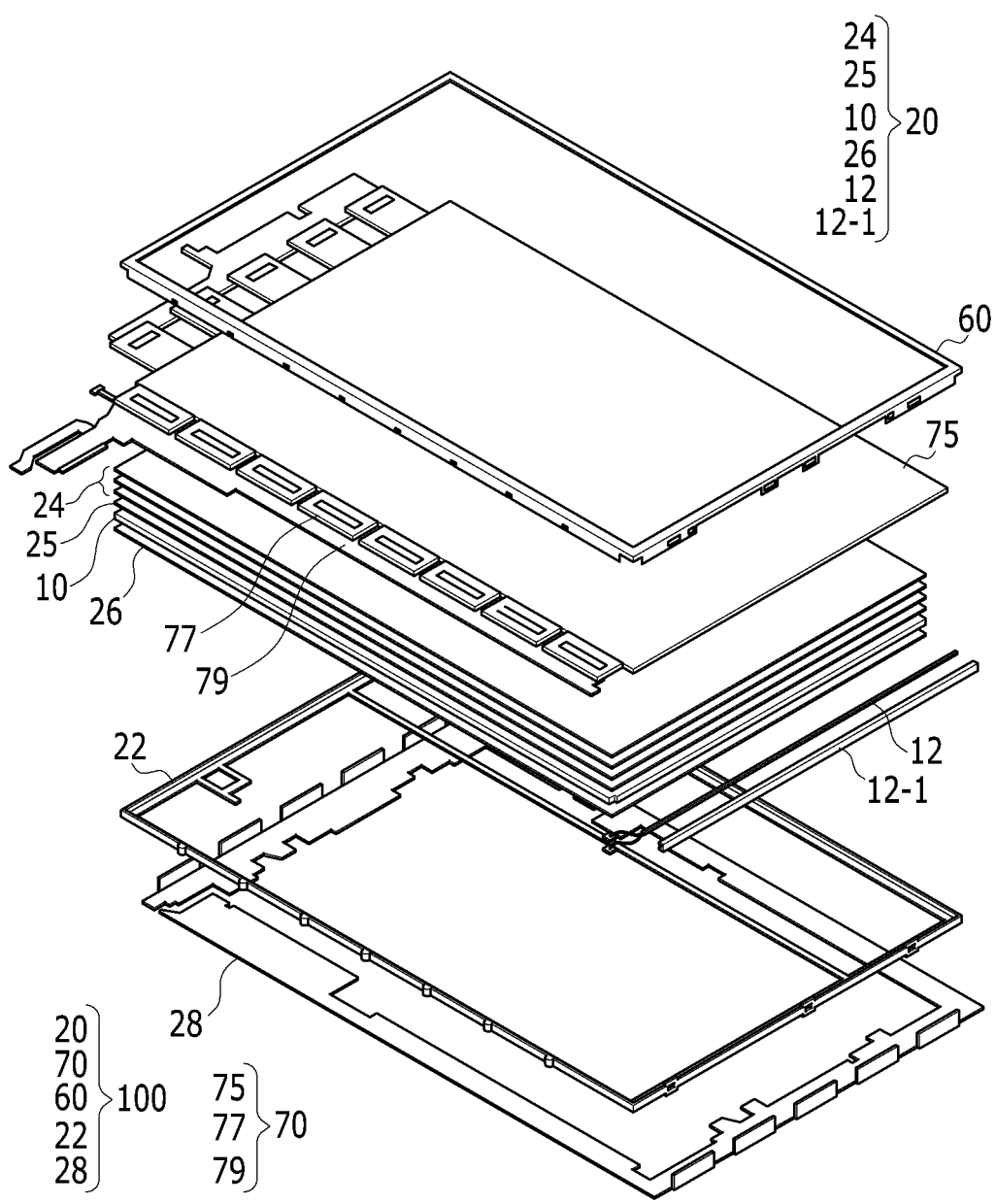
FIG. 13 is an exploded perspective view of an exemplary embodiment of a display device according to the invention.

FIG. 13 is an exploded perspective view illustrating an exemplary embodiment of a display device according to the invention.

FIG. 13 illustrates an exemplary embodiment, where the display device is a liquid crystal display 100, but not being limited thereto.

In an exemplary embodiment, the liquid crystal display 100 includes the backlight unit 20 for supplying light and a liquid crystal panel assembly 70 supplied with light to display images. In such an embodiment, the liquid crystal display 100 further includes a top chassis 60, a mold frame 22, and a bottom chassis 28 which fix the backlight unit 20 and the liquid crystal panel assembly 70.

The backlight unit 20 provides light to the liquid crystal panel assembly 70 disposed thereon, and the liquid crystal display panel assembly 70 controls light supplied from the backlight unit 20 to represent a grayscale of an image, thereby displaying the image.

First, the liquid crystal panel assembly 70 includes a liquid crystal panel 75, an integrated circuit ("IC") chip 77 and a flexible printed circuit ("FPC") board 79.

The liquid crystal panel 75 includes a thin film transistors ("TFT") substrate including a plurality of TFTs, an upper substrate disposed opposite to the TFT substrate, and a liquid crystal layer disposed between the TFT substrate and the upper substrate. The IC chip 77 may be disposed, e.g., mounted, on the TFT substrate to control the liquid crystal panel 75.

The TFT substrate is a transparent insulation substrate on which the TFTs in a matrix type are disposed. In such an embodiment, a source terminal of the TFT substrate is connected to a data line, and a gate terminal of the TFT substrate is connected to a gate line. In such an embodiment, a drain terminal of the TFT substrate is connected to a pixel electrode including a transparent conductive material, e.g., indium tin oxide ("ITO").

The data line and the gate line of the liquid crystal panel 75 are connected to the flexible circuit board 79, and when an electrical signal is input from the flexible circuit board 79, the electrical signal is transferred to a source terminal and a gate terminal of the TFT and the TFT is turned on or off based on the scanning signal applied to the gate terminal through the gate line to transfer the image signal applied to the source terminal through the data line to the drain terminal or block the transfer of the image signal to the drain terminal. The flexible circuit board 79 receives the image signal from an outside of the liquid crystal panel 75 to apply the driving signal to the data line and the gate line of the liquid crystal panel 75, respectively.

In an exemplary embodiment, the upper substrate is disposed opposite to the TFT substrate. The upper substrate is a substrate in which a red, green and blue color filter that represents a predetermined color by passing light therethrough is provided, e.g., formed, by a thin film process and a common electrode made of ITO is deposited on the color filter. When the thin film transistor is turned on by applying power to the gate terminal and the source terminal of the TFT, an electric field is generated between the pixel electrode and the common electrode of the upper substrate. An aligned angle of a liquid crystal between the TFT substrate and the upper substrate is changed by the electric field, and the light transmittance is changed based on the changed aligned angle to display an image.

Figure 14:
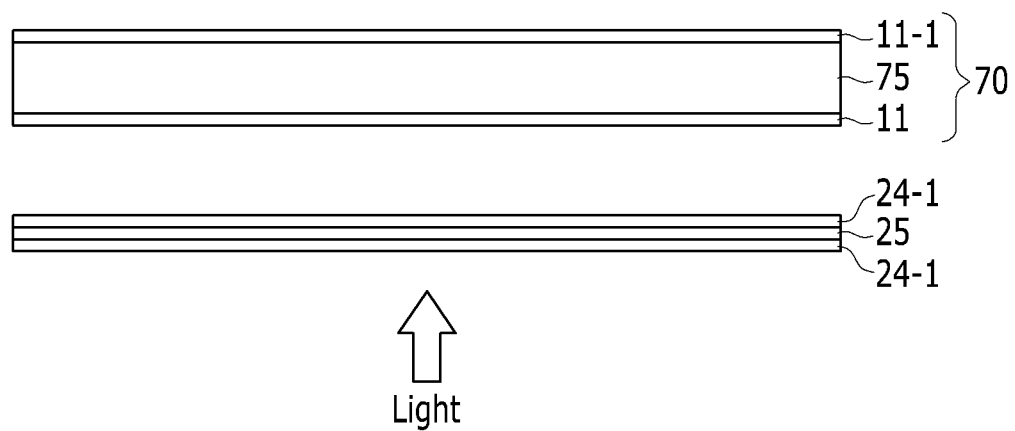
FIG. 14 is a cross-sectional view of an exemplary embodiment of the display device according to the invention.
Figure 15:
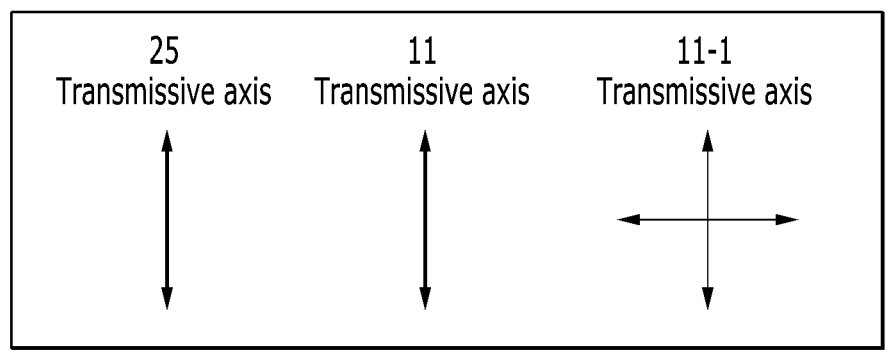
FIG. 15 is a diagram illustrating transmissive axes in an exemplary embodiment of the display device according to the invention.

A polarizing plate (e.g., a lower polarizing plate 11 or an upper polarizing plate 11-1 of FIGS. 14 and 15) is disposed outside (e.g., on an outer surface of) the liquid crystal panel 75. Each polarizing plate has a transmissive axis.

The flexible circuit board 79 generates an image signal and a scanning signal, which are a signal for driving the liquid crystal display 100, and a plurality of timing signals for applying the image and scanning signals at a predetermined timing, and the flexible circuit board 79 applies the image signal and the scanning signal to the gate line and the data line of the liquid crystal panel 75, respectively.

Hereinabove, the structure of an exemplary embodiment of the liquid crystal panel 75 has been described, but the invention is not limited thereto. In an alternative exemplary embodiment, the display device may be the liquid crystal panel 75 having different structure. In one alternative exemplary embodiment, for example, the common electrode or the color filter may be disposed on the TFT substrate. In an alternative exemplary embodiment, the liquid crystal panel 75 may further include a printed circuit board ("PCB"), and the PCB and the TFT substrate may be connected to each other by the flexible circuit board.

In an exemplary embodiment, the display device may include various light receiving type display panels.

Referring back to FIG. 13, in an exemplary embodiment, the lower portion of the liquid crystal panel assembly 70 provided with the backlight unit 20 for uniformly providing light to the liquid crystal panel 75 is disposed in (e.g., received on) the bottom chassis 28.

In such an embodiment, the top chassis 60 is disposed on the liquid crystal panel assembly 70, and the top chassis 60 effectively prevents the liquid crystal panel assembly 70 from being separated from the bottom chassis 28 by bending the flexible circuit board 79 to an outside of the mold frame 22.

The backlight unit 20 includes a light source 12 coupled to (e.g., fixed or attached to) the mold frame 22 to supply light to the liquid crystal panel assembly 70, a substrate 12-1 that supplies power to the light source 12, a light guide plate 10 that guides the light emitted from the light source 12 to supply the light to the liquid crystal panel assembly 70, a reflective sheet 26 disposed on a lower front surface of the light guide plate 10 to reflect light, an optical sheet 24 that secures luminance characteristics of light from the light source 12 and the quantum rod sheet 25 to the liquid crystal panel assembly 70.

The optical sheet 24 may include at least one of a prism sheet having a prism structure and a diffuser sheet that substantially uniformly diffuses light, In an exemplary embodiment, the quantum rod sheet 25 functions as the optical sheet 24 may not include a luminance enhancement film, such as a dual brightness enhancement film ("DBEF"), which reflects a part of the light in the polarization direction and transmits the light in the polarization direction vertical thereto to improve the efficiency of light, and the quantum rod sheet 25 functions as the luminance enhancement film.

In an exemplary embodiment, the quantum rod sheets 25 are disposed on the optical sheet 24. In an alternative exemplary embodiment, where the backlight unit 20 includes a plurality of optical sheets 24-1, the quantum rod sheet 25 may be disposed between the optical sheets 24-1, as shown in FIG. 14. The quantum rod sheet 25 emits light polarized substantially in the predetermined direction, and the polarized light from the quantum rod sheet 25 may substantially parallel to the direction of the transmissive axis of a lower polarizing plate 11 as illustrated in FIG. 15.

According to an exemplary embodiment, as shown in FIG. 13, the light source 12 may include a light emitting diode ("LED"). The LED may use a diode that emits blue light or a diode that emits ultraviolet rays. In such an embodiment, a diode that emits light having a specific wavelength may be included. In such an embodiment, the light source 12 may emit the light having the specific wavelength, and the LED of the light source 12 does not include a phosphor which changes the light having the specific wavelength to the white light, such that the manufacturing costs of the light source 12 may be reduced.

In such an embodiment, the light source 12 may emit the light having the specific wavelength, and the quantum rod sheet 25 may amplify the light having the specific wavelength or convert the light having the specific wavelength into light having a different wavelength, and then provide the amplified or converted light to the upper portion of the backlight unit 20.

In such an embodiment, a wavelength range of polarized light is determined based on the diameter of the quantum rod 25-2 at a central section, that is, the diameter of the central section of the quantum rod 25-2 in the quantum rod sheet 25. Accordingly, in an exemplary embodiment, where the light source 12 provides the blue light using two kinds of the diameters of the quantum rod 25-2 at a central section as shown in FIGS. 6 to 8, all of the polarized blue, green, and red light may be emitted from the quantum rod sheet 25. In such an embodiment, the blue light is progressed by polarizing the light provided from the light source 12, but the green and red lights are provided by being polarized while being amplified or converted by each of the quantum rods 25-2 having different diameters. Therefore, the backlight unit 20 provides the light of all of the primary colors to the liquid crystal panel 75.

According to an exemplary embodiment of the invention, the light source 12 may emit the white light or the ultraviolet rays. In such an embodiment, the quantum rods 25-2 of the quantum rod sheet 25 may have various diameters of the central section corresponding to the light provided thereto.

In an exemplary embodiment, the light source 12 is an edge type backlight unit 20 which is disposed at a side of the light guide plate 10. In an alternative exemplary embodiment, the light source 12 may have a direct type structure in which the light source 12 is disposed under the quantum rod sheet 25.

Hereinafter, an exemplary embodiment of the invention, including the optical sheet 24 with the quantum rod sheet 25, will be described with reference to FIG. 14.

FIG. 14 is a cross-sectional view illustrating an exemplary embodiment of a display device according to the invention.

FIG. 14 schematically illustrates the lower and upper polarizing plates 11 and 11-1 attached on lower and upper surfaces of the liquid crystal panel 75, respectively, and diffusion plates 24-1 and the quantum rod sheet 25 included in the backlight unit, other components of the display device are omitted for convenience of illustration.

FIG. 14 illustrates an exemplary embodiment in which two diffusion plates 24-1 included in the backlight unit as the optical sheet 24 are included, and the quantum rod sheet 25 is disposed between the diffusion plates 24-1.

In such an embodiment, the diffusion plates 24-1 are disposed under the quantum rod sheet 25 such that light incident on the quantum rod sheet 25 may be substantially uniformly applied to various regions of the quantum rod sheet 25. In such an embodiment, the light having the specific wavelength may be provided from the light source 12, and polarized light in predetermined wavelength regions generated from the quantum rod sheet 25 based on the light having the specific wavelength may be substantially uniformly provided to the display panel 75. In such an embodiment, the diffusion plate 24-1 disposed above the quantum rod sheet 25 distributes the light from the quantum rod sheet 25 substantially uniformly on an entire region of the liquid crystal panel 75.

According to an exemplary embodiment, a pair of prism sheets (not shown) may be further disposed on the upper diffusion plate 24-1.

The light passed through the quantum rod sheet 25 has wavelength ranges corresponding to at least three colors to allow the liquid crystal panel 75 to display colors independently of the wavelength of light provided from the light source 12, and the light passed through the quantum rod sheet 25 is polarized substantially in the predetermined direction.

The light polarized in the quantum rod sheet 25 is incident on the lower polarizing plate 11 which is disposed under the liquid crystal panel 75 and has a polarizing axis substantially parallel to the transmission axis of the lower polarizing plate 11, as shown in FIG. 15.

FIG. 15 is a view illustrating the transmissive axes in an exemplary embodiment of the display device according to the invention.

FIG. 15 illustrates the transmissive axis of the quantum rod sheet 25, the transmissive axis of the lower polarizing plate 11, and the transmissive axis of the upper polarizing plate 11-1.

As illustrated in FIG. 15, the transmissive axis (or polarizing axis) of the quantum rod sheet 25 is substantially parallel to the transmissive axis of the lower polarizing plate 11, such that substantially an entire portion of the light provided from the backlight unit 20 transmits the lower polarizing plate 11, thereby increasing the efficiency of light.

In such an embodiment, the transmissive axis of the upper polarizing plate 11-1 may be substantially parallel or vertical to the transmissive axis of the lower polarizing plate 11 or the quantum rod sheet 25 as illustrated in FIG. 15. In an alternative exemplary embodiment, the transmissive axis may be disposed in other directions.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A quantum rod sheet, comprising:
a first support layer comprising a plurality of grooves which each extend in a predetermined direction along a substantial length of the first support layer;
a plurality of quantum rods arranged substantially in the predetermined direction along the grooves of the first support layer; and
a second support layer which covers the first support layer and the quantum rods.

2. The quantum rod sheet of claim 1, wherein
a section shape of the grooves has a triangular shape, a quadrangular shape, or a partially round shape.

3. The quantum rod sheet of claim 2, wherein
when each of the quantum rods is defined having a longitudinal length, and a width of the grooves is denoted by w, the grooves have a structure which satisfies the following inequation: w<the longitudinal length.

4. The quantum rod sheet of claim 2, wherein
when a diameter of the quantum rods is denoted by a, and a depth of the grooves is denoted by h, the grooves have a structure which satisfies the following inequation: h>3a.

5. The quantum rod sheet of claim 2, wherein
the section shape of the grooves is a triangular shape, and when a depth of the grooves is denoted by h, and a width of the grooves is denoted by w, the grooves have a structure which satisfies the following inequation:

$$h > \frac{\sqrt{3}}{2} \times w.$$

6. The quantum rod sheet of claim 1, further comprising:
a plurality of protective layers disposed an outer surface of the first support layer and an outer surface of the second support layer.

7. The quantum rod sheet of claim 6, further comprising:
a plurality of barriers disposed on the outer surface of the first support layer and the outer surface of the second support layer and disposed on an inner surface of the protective layer.

* * * * *